United States Patent [19]

Cwirzen

[11] Patent Number: 4,675,778

[45] Date of Patent: Jun. 23, 1987

[54] OVERLOAD PROTECTOR FOR COMMUNICATIONS SYSTEMS

[75] Inventor: Casimir Z. Cwirzen, Arlington Heights, Ill.

[73] Assignee: Northern Telecom Limited, Montreal, Canada

[21] Appl. No.: 714,500

[22] Filed: Mar. 21, 1985

[51] Int. Cl.[4] .................................................. H02H 3/20

[52] U.S. Cl. .................................... 361/119; 361/129; 361/124; 337/29; 337/32; 337/34

[58] Field of Search ................................ 361/117-120, 361/124, 130, 129; 337/28, 29, 32-34; 179/91 R, 98; 339/99 R

[56] References Cited

U.S. PATENT DOCUMENTS

| | | | |
|---|---|---|---|
| 4,133,019 | 1/1979 | Roach et al. | 361/124 |
| 4,158,869 | 6/1979 | Gilberts | 361/119 X |
| 4,159,500 | 6/1979 | Baumbach et al. | 337/32 X |
| 4,161,762 | 7/1979 | Scheithauer | 337/32 X |
| 4,326,231 | 4/1982 | Coren | 361/119 |

*Primary Examiner*—A. D. Pellinen
*Assistant Examiner*—Todd E. DeBoer
*Attorney, Agent, or Firm*—Schwartz, Jeffery, Schwaab, Mack, Blumenthal & Evans

[57] ABSTRACT

A protector for telephone systems and similar systems is in the form of an elongate housing formed by two hollow box-like members, one fitting within the other. In the bottom member, a line terminal is provided at each end, each terminal connected to a line contact member in the housing. A ground terminal is provided at a mid position in the bottom member, connected to a support and ground member. A protector device assembly is mounted in the support and ground member, providing a breakdown gap connected between each line contact member and the ground. The device assembly can be two-electrode gas tube devices, a three-electrode gas tube device, or other devices. Back-up protector devices are positioned between each line contact member and the support and ground member.

15 Claims, 26 Drawing Figures

OVERLOAD PROTECTOR FOR COMMUNICATIONS SYSTEMS

This application relates to overload protectors for communications systems. Particularly the invention relates to an overvoltage protector.

In communications systems, such as telephone systems, it is necessary to position overload protectors at various positions to protect sensitive parts of the system. Thus protectors are provided at a user's premises to protect telephone sets and other terminal and similar equipment against an overload, usually a voltage overload. The overload can be caused by lightening strikes on the lines to the customer's premises, and by contact with power lines. Protectors are also provided at central offices, and at other places, to protect switching and other equipment.

Such protectors can be provided as modules which plug in, these usually being provided at central office and similar equipment centers. At other places it is often convenient to position protectors in the form of permanently sealed housings, the housing carrying terminals to which service lines and ground connections can be made.

The present invention provides a protector having a housing formed of two hollow box-like members, one fitting within the other, and a protector device for each of two lines positioned in the housing. Alternative forms of protector devices can be used. If desired, potting compound is injected into the housing and one housing member has enclosures into which the potting compound is injected, the enclosures serving to localize the potting compound at the line terminal entries and preventing the compound from spreading into the main body part of the housing and interfering with the operation of the protector devices.

A protector in accordance with the invention broadly comprises a hollow housing and a protector device for each line positioned within the housing. The housing is formed by a first hollow box member of elongate form open at a top face and having a line terminal extending outward from the bottom face at each end of the housing member, for connection to line conductors, and a ground terminal at a position intermediate the line terminals; and a second hollow box member of elongate form open at a bottom face, one box member fitting within the other. Mounting means are provided within the housing for holding the protector devices, each device being between a line terminal and the ground terminal.

The invention will be readily understood by the following description of certain embodiments, by way of example, in conjunction with the accompanying drawings, in which.

Figure 1:
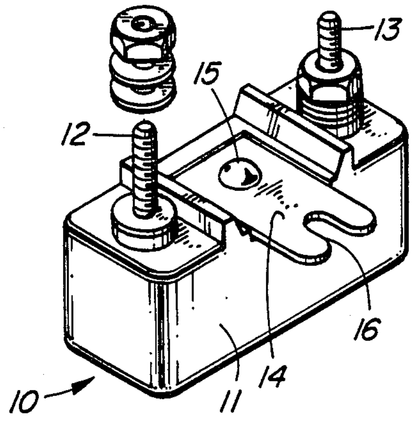
FIGS. 1, 2 and 3 are perspective views of protectors with alternative forms of ground terminal.
Figure 2:
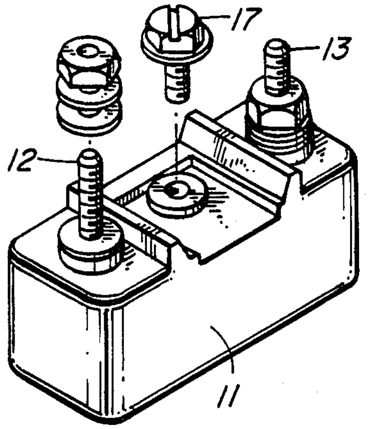
Figure 3:
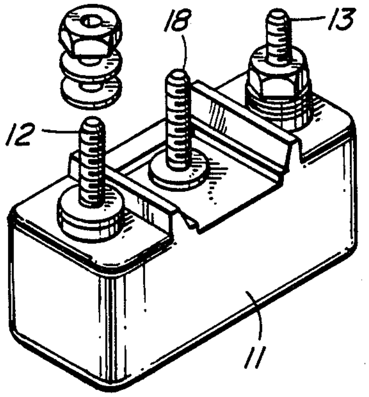

Considering FIG. 1, there is illustrated a protector, indicated generally at 10, which has a housing 11, within which are protector devices, described later in conjunction with FIGS. 22 and 23. The housing is elongate and, in the example, of rectangular cross-section normal to the length. Adjacent each end of the housing a line terminal 12 and 13 projects outward. Between the line terminals a ground terminal 14 is provided. In FIG. 1 the ground terminal is in the form of a metal blade-like member extending laterally, being rivetted to a ground and support member in the housing, by rivet 15. The terminal has a slotted end, at 16, for connection to a ground post. In FIG. 2 the ground terminal comprises a screw 17 which screws into and makes contact with the ground and support member. In FIG. 3, the ground terminal comprises a threaded stud 18 which connects with the ground and support member.

Figure 4:
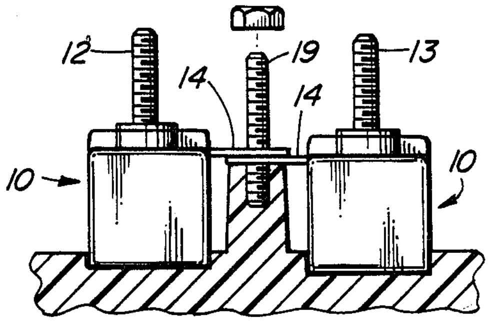
FIG. 4 is an end view illustrating two protectors as in FIG. 1 connected to a common ground.
Figure 5:
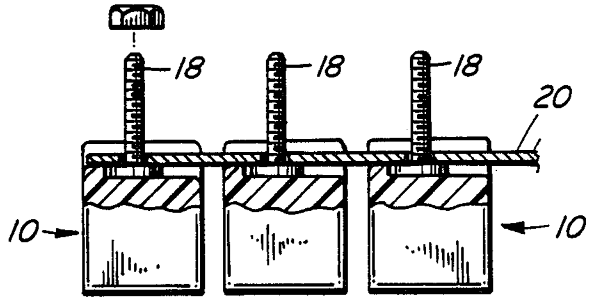
FIGS. 5 and 6 are diagrammatic end views, partly in section, illustrating a plurality of protectors as in FIGS. 2 and 3 respectively, connected to a common ground bus bar.
Figure 6:
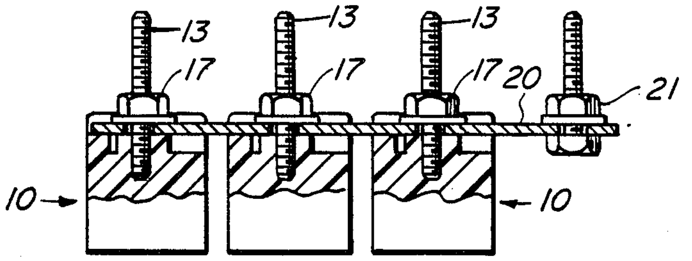
Figure 8:
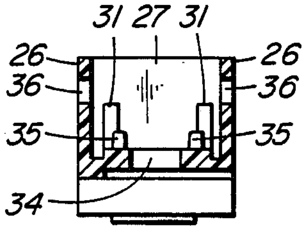
FIGS. 8 and 9 are cross-sections on the lines VIII—VIII and IX—IX respectively on FIG. 7.
Figure 7:
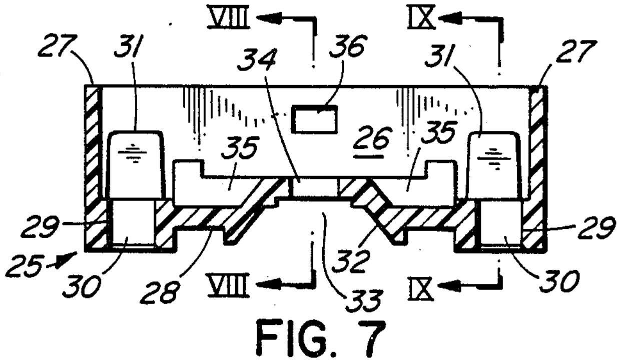
FIG. 7 is a cross-section through one housing member for a protector, on the VII—VII of FIG. 13.
Figure 9:
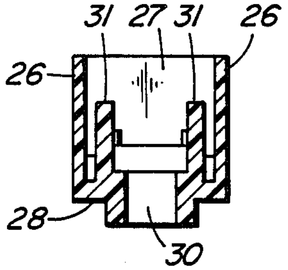
Figure 10:
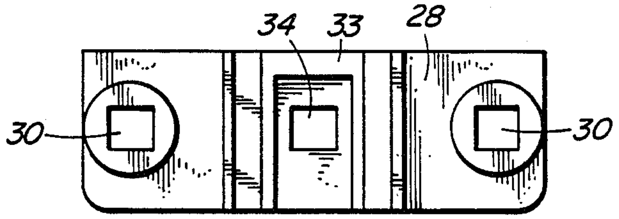
FIGS. 10, 11, 12 and 13 are bottom plan view, side view, end view and top plan view respectively of the housing member of FIGS. 7, 8 and 9.
Figure 12:
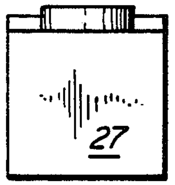
Figure 11:
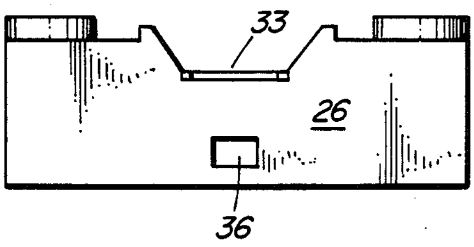
Figure 13:
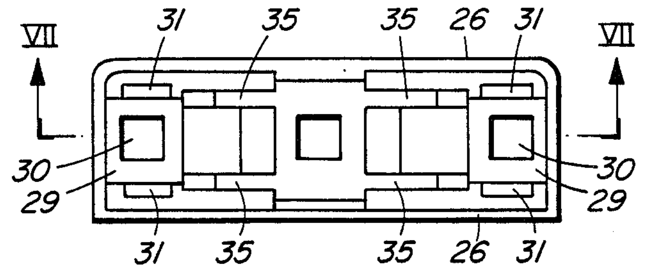
Figure 14:
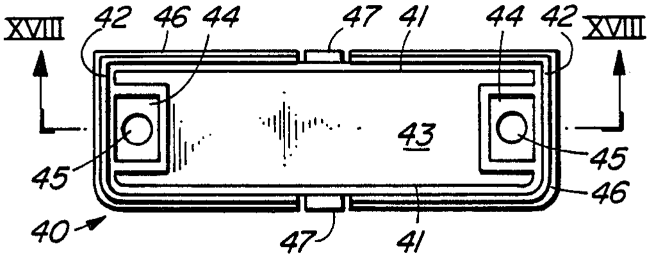
FIG. 14 is a bottom plan view of the other housing member for use with the member of FIGS. 7 to 13.
Figure 16:
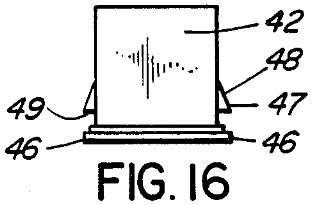
FIGS. 15, 16 and 17 are side view, end view and top plan view respectively of the housing member of FIG. 14.
Figure 15:
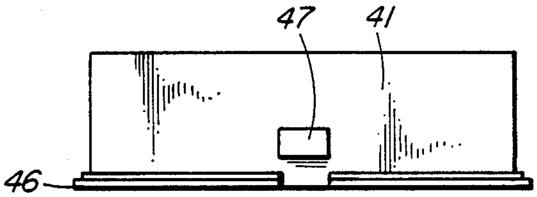

FIG. 4 illustrates the connection of two protectors to a common ground post or stud 19. Only two protectors of the form of FIG. 1 can be connected together. FIGS. 5 and 6 illustrate the connection of a plurality of protectors of the form of FIG. 2 or FIG. 3. A common ground bus bar 20 extends between the protectors, a ground connection being made at one end of the bus bar, as indicated at 21. A ground connection can be made at any desired position along the bus bar.

FIGS. 7 to 13 illustrate a housing member, for convenience referred to as the first or bottom housing member. The member is indicated generally at 25 and is of elongate hollow, box-like form. The member has two side walls 26, two end walls 27, and a bottom wall 28. The member is open at the top. The bottom wall has a thickened portion 29 at each end and an aperture 30 is provided in each portion 29 for receipt of a line terminal. The apertures in the example are square and cooperate with a square portion on the line terminal to resist twisting. Also at each end, ribs 31 extend up from the portions 29, spaced from but close to the side walls 26. At a central position, the bottom wall 28 is raised upward, at 32, forming a recess 33 on the outside of the bottom wall. An aperture 34 is formed in the raised portion, and again is of square form to cooperate with a squared portion on a ground terminal. Shallow ribs 35 extend on each side from the raised portion towards the ends, stopping short of the ribs 31. Ribs 35 act to locate a support and ground member in the housing. In each side wall 26, at a mid position, is an aperture 36 for cooperation with a snap-in member on the other housing.

FIGS. 14 to 18 illustrate a further housing member, for convenience referred to as the second or top housing member. The member is indicated generally at 40 and is of hollow elongate box-like form. The member has side walls 41, end walls 42 and a top wall 43. In this example, a tubular structure, indicated at 44, extends down from the top wall, at each end, to finish level with the open bottom face of the member. An aperture 45 is formed at each end of the member, in the top wall 43, within the tubular structure 44. A narrow rim 46 is formed around the top wall to provide a seating for the top edges of housing 25, when the housings are assembled together. On the outside of each side wall is a projection 47, positioned at a mid position along the housing member. The projections have outwardly inclined lower surfaces 48 and flat upper surfaces 49. The projections 47 snap into the apertures 36 in the side walls 26 of member 25.

Figure 19:
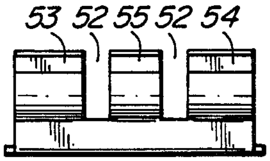
FIGS. 19, 20 and 21 are side view, end view and bottom plan view respectively of a spring clip mounting member for holding protector devices within the protector housing.
Figure 17:
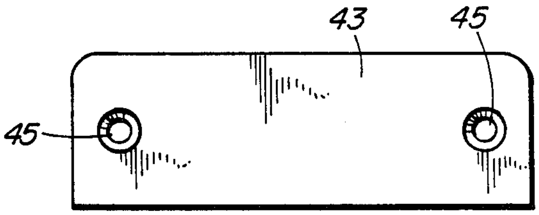
Figure 20:
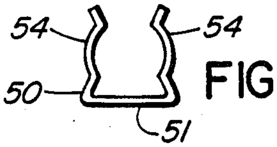
Figure 21:
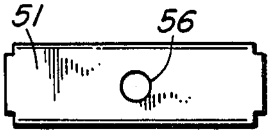
Figure 18:
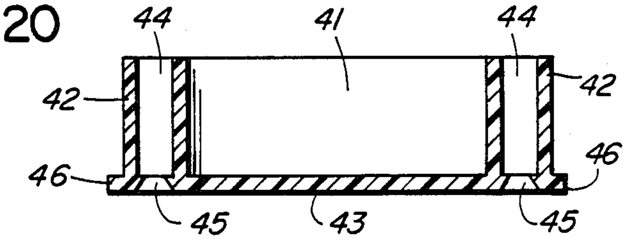
FIG. 18 is a cross-section on the line XVIII—XVIII on FIG. 14.

FIGS. 19, 20 and 21 illustrate a spring support and ground member 50. The support member has a substantially flat bottom surface 51 which is elongate, and upwardly extending arcuate walls divided into sections by slots 52. The sections comprise end sections 53 and 54 and center sections 55. The sections have concave inner surfaces and the opposed walls define a cylindrical mounting position. A hole 56 in the bottom surface 51 provides for attachment of the support member in the bottom housing 25. The bottom surface 51 rests on the ribs 35 in the bottom housing, and on the raised portion of the bottom wall.

Figure 22:
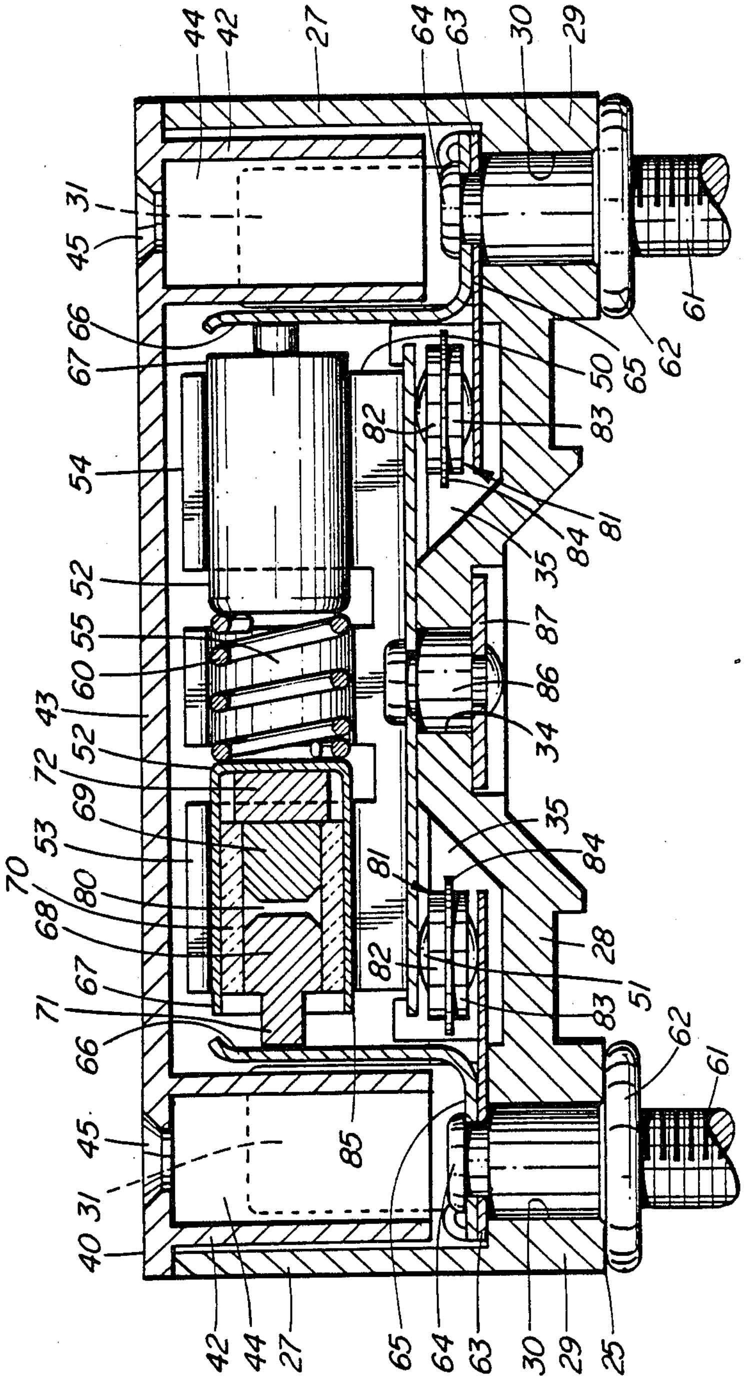
FIG. 22 is a cross-section, as on the lines VII—VII of FIG. 13 and XVIII—XVIII of FIG. 14, of an assembled protector, to an enlarged scale, with one form of protector device.

FIG. 22 illustrates an assembled protector, similar to the protector illustrated in FIG. 1, using two housing members as illustrated in FIGS. 7 to 18. A support and ground member as in FIGS. 19 to 21 is also used. In FIG. 22, the same reference numerals are used for the same items as in FIGS. 1 to 21.

The support and ground member 51 holds two protector devices, one in each of the end sections 53 and 54. A compression spring 60 is positioned between the devices, urging them apart. In each aperture 30 in the bottom housing member 35, there is positioned a line terminal 61. For a telephone system, one terminal would be for Tip and the other for Ring. The line terminals are retained in place by means of a shoulder 62 which is in contact with the outer surface of the bottom wall and by rivetting over the inner end. Prior to rivetting, the inner end of the terminal is passed through a hole in a line contact member indicated at 63. After assembly of the line contact member to the line terminal, the end of the terminal is rivetted, as shown at 64.

The line contact members 63 are in the form of Tee-shaped members, with the cross-bar 65 of the Tee resting on the bottom wall of the bottom housing and the leg 66 of the Tee extending up spaced inwardly a short distance from the edge of ribs 31 and the tubular structure 44. Conveniently, the contact member is made from a strip of suitable metal bent back on itself to form the cross-bar and then bent up to form the legs. A hole extends through the double thickness of metal of the cross-bar for the end of the line terminal. In a free position, the legs 66 are inclined slightly towards each other, being pushed apart on insertion of the protector devices and spring 60.

Each protector device comprises, in the example, a gas tube protector within a metal cup. The metal cups are indicated at 67 and the details of the left hand gas tube protector are shown in cross-section. Thus a gas tube protector, as in the present example, comprises two electrodes 68 and 69 separated by a predetermined gap 80 by positioning in a ceramic tube 70. Electrode 68 has a central projection 71 which extends through an open end of the metal cup and makes contact with the related leg 68 of a line contact member 63. Between electrode 69 and the closed end of the metal cup is a disc of fusible metal 72. The disc 72 makes contact with the electrode 69 and the end of the cup. Spring 60 makes contact with both cups. Also, there is electrical contact between the cups 67 and the support and ground member 50. On an overvoltage condition, a spark discharge or breakdown occurs across the gap 80, connecting the line conductor to ground. Other forms of protector devices can be used.

With gas tube protector devices, the gap is usually at a sub-atmospheric pressure, with the electrode sealed to the ceramic tube. If the seal breaks, the device becomes vented to atmosphere and the breakdown voltage rises to an unacceptable value. To provide some protection in such circumstances, a back-up device is provided. In the example illustrated in FIG. 22, a back-up device is provided for each line and are indicated at 81.

The back-up devices illustrated in FIG. 22 each comprise two electrodes 82 and 83 separated by and bonded to a disc 84 of insulating material. The disc has a central hole which defines a gap between the electrodes. The gap is arranged to breakdown at a voltage which is slightly higher than the voltage at which the gap 80 breaks down. The back-up devices are held between the cross-bar 65 of the line contact member and the bottom 51 of the support and ground member 50. The cross-bar 65 and bottom 51 can be dimpled to assist in locating the back-up device, which has convex contact surfaces on the electrodes 82 and 83.

In the event of a constant voltage overload, the electrodes 68 and 69 heat up and eventually the disc of fusible metal 72 melts. This permits the cup 67 to be moved towards the adjacent line contact member 66 under the action of the spring 60. The rim 85 of the cup contacts the line contact member directly and thus connects the line contact member to ground. Such melting of the fusible disc can also occur with current overloads occuring with voltage breakdown of the gap. Contact between the support and ground member 50 is made via a rivet 86 which connects the bottom of the support and ground member to a ground contact member 87, corresponding to member 14 in FIG. 1.

Figure 23:
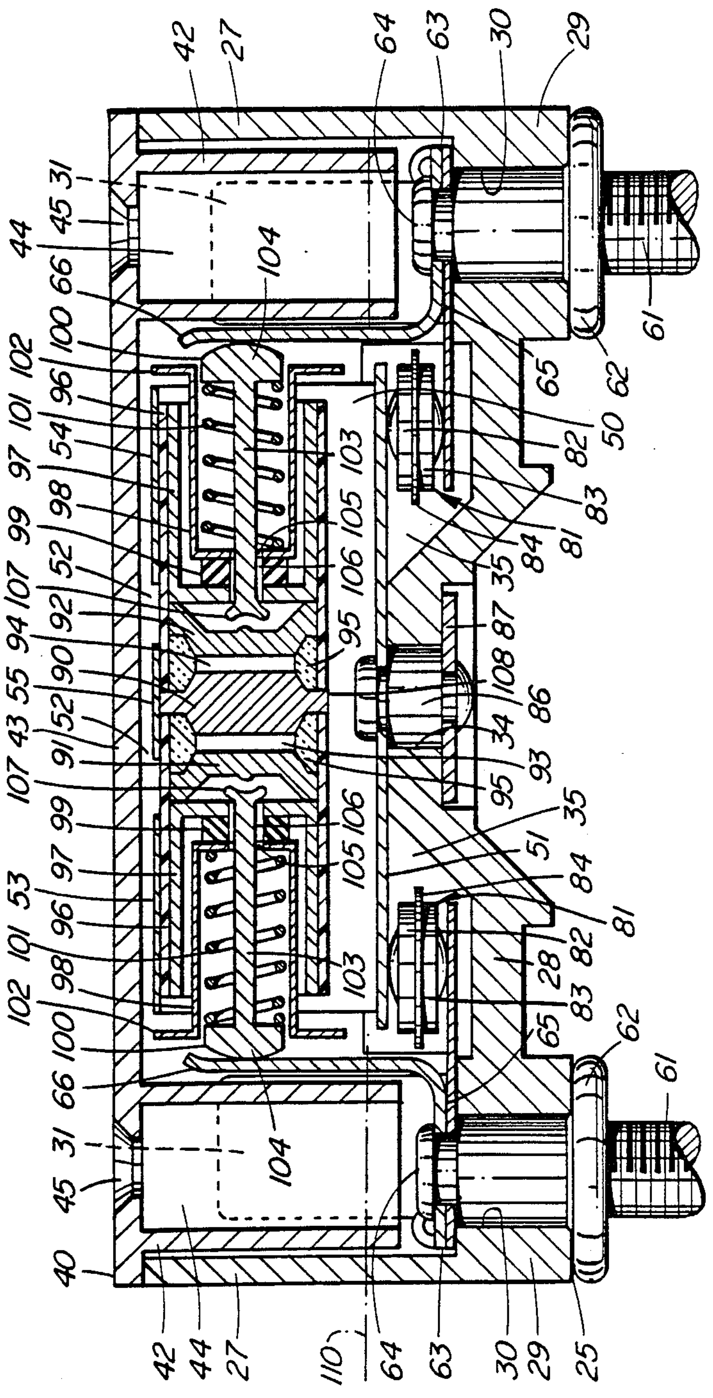
FIG. 23 is a cross-section similar to that of FIG. 22, illustrating an alternative form of protector device.

FIG. 23 illustrates an alternative form of protector device in a housing which is similar to the housing in FIG. 22. Common references are used in FIGS. 22 and 23 for common details. The protector device in FIG. 23 is a three electrode protector device. The device has a central electrode 90, on either side of which are positioned line electrodes 91 and 92. The line electrodes are spaced from the central electrode to define gaps 93 and 94. The line electrodes and central electrode are joined in a gas-tight sealed assembly by ceramic rings 95. The central electrode extends radially a small distance beyond the periphery of the ceramic rings and line electrodes. The gaps 93 and 94 are at a sub-atmospheric pressure and break down at a predetermined voltage.

Extending on each side of the central electrode 90 is a plastic tube 96. Within each tube is mounted a further assembly comprising an outer metal cup 97, an inner metal cup 98, a fusible disc 99, a contact member 100 and a compression spring 101. The outer cup 97 is a fairly tight fit in the plastic tube 96, which is also a fairly tight fit on the line electrode and ceramic ring. The bottom of the outer cup is in contact with the related line electrode 91 or 92. The inner cup is a loose sliding fit in the outer cup and between the outside of the bottom of the inner cup and the inside of the bottom of the outer cup is positioned the fusible disc 99. At its outer end the inner cup has a radially outwardly extending flange 102. Through the inner and outer cups, and the fusible disc, extends the contact member 100. Contact member 100 has a stalk portion 103 and a relatively large disc-like head portion 104. The heat portion is a loose sliding fit in the screw cup 98 and acts as the outer abutment for the compression spring 101. The stalk portion passes through the spring, through a hole 105 in the bottom of the inner cup, through a hole 106 in the fusible disc and through the bottom of the outer cup, being riveted over on the outside of the bottom of the outer cup, at 107. The hole 105 in the inner cup is somewhat larger than the stalk portion to permit easy sliding of the inner cup on the stalk member.

The protector is held together as an assembly by the plastic tubes 96, which also act as electrical insulators around the line electrodes 91 and 92 and the outer cups 97. The central electrode 90 extends radially from between the opposed ends of the tubes 96 and is the ground electrode, contact being made with the peripheral surface 108. In use, line terminals or contact members make contact with the end surface of the head portions 104 of contact members 100.

The arrangement is such that on an occurrence of a voltage above a predetermined value, on a line conductor, the related gap 93 or 94 breaks down with a spark discharge between the line electrode and the central or ground electrode. If the overvoltage continues, then the line electrode, and the ground electrode, heats up and eventually the fusible disc 99 melts. This permits the spring 101 to move the inner cup 98 axially within the outer cup 97. The flange 102 then contacts the support and ground member. A permanent connection to ground then exists and the protector must be replaced before service can be restored.

In the form of the invention as illustrated in FIGS. 22 and 23, with the second or top housing as in FIGS. 14 to 18, the tubular structures 44, with associated apertures 45, are particularly intended for the injection of a potting or other sealing compound to seal the two housings around the periphery. The volume of each of the tubular structures 44 is known and a preset amount of compound is injected through each aperture 45. Sufficient compound is injected so that it will issue from the open end of each tubular structure and will then travel by capillary action in the small peripherally extending gap between the outside surface of the housing 40 and the inner surface of the housing 25. A typical level of the compound is indicated by the chain dotted line 110 in FIG. 23. The compound will not necessarily extend very far up the gap but will extend all round, forming a seal which will prevent ingress of water, water vapour, dust and other undesirable material. The amount of compound injected is controlled to prevent the compound interfering with the action of the protector devices.

Figure 25:
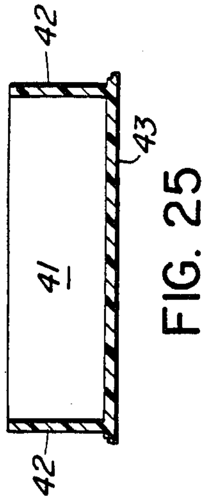
FIG. 25 is a cross-section on the lines XXV—XXV of FIG. 24.
Figure 24:
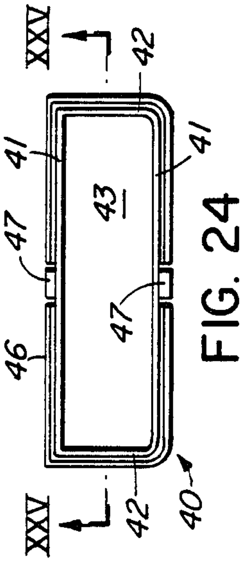
FIG. 24 is a bottom plan view of a housing as in FIG. 14 illustrating a modification thereof.
Figure 26:
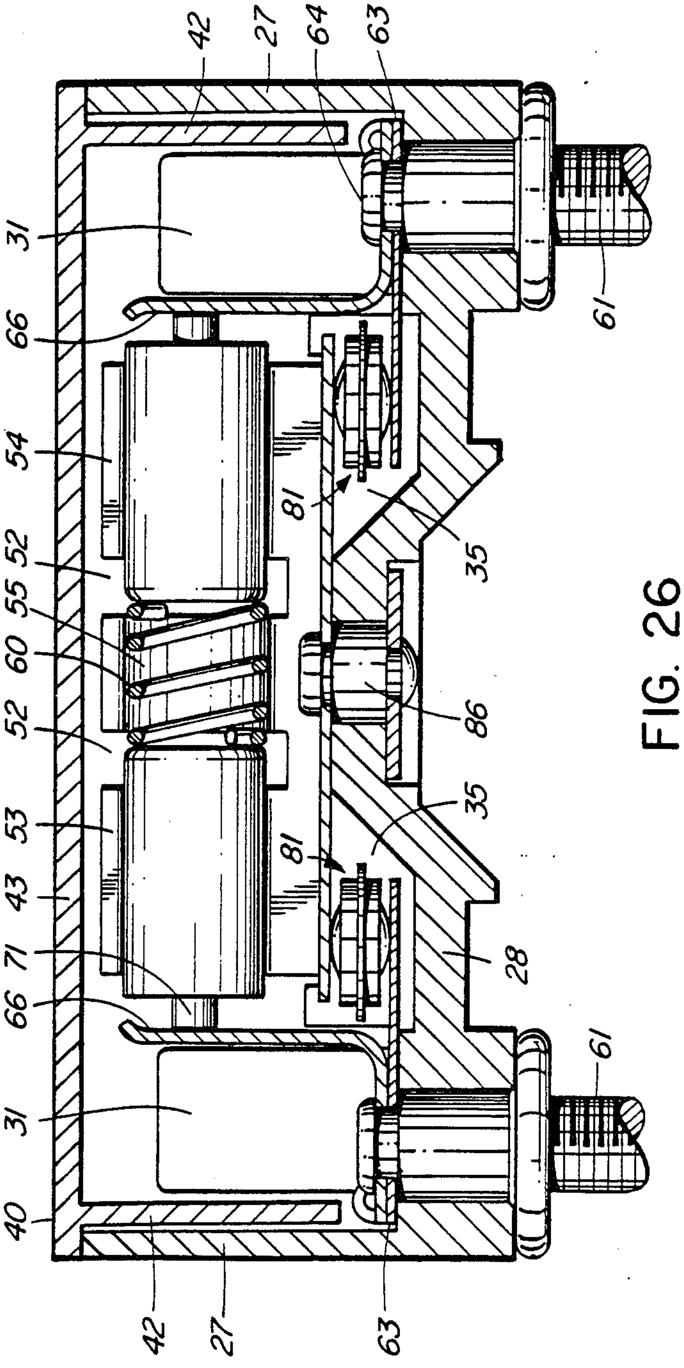
FIG. 26 is a cross-section similar to that of FIG. 22, but with one housing modified as in FIGS. 24 and 25.

If it is not required that a potting or other compound is injected, or some other way of sealing is provided, the tubular structures 44 can be omitted. FIGS. 24 and 25 illustrate the modification to the housing 40, omitting the tubular structures. The same reference numerals are used in FIGS. 24 and 25 as are used in FIGS. 14 and 18 for the same details. FIG. 26 illustrates an assembled protector as in FIG. 22, but with a modified housing 40 as in FIGS. 24 and 25. The same reference numerals are used in FIG. 26 as are used in FIG. 22 for the same details.

In the examples illustrated and described, the housings 25 and 40 are shown as being held together by the projections 47 snapping into the apertures 36. Other ways of holding the housings together can be used, for example bonding the housings together by an adhesive, some bonding or other.

What is claimed is:

1. A protector for communications systems, comprising a hollow housing; the housing including a first hollow box-like member having four side walls of elongate form open at a top face and having a line terminal extending from a bottom face at each end for connection to line conductors, and a ground terminal at a position intermediate the line terminals, a second hollow box-like member of elongate form open at a bottom face, one box-like member fitting within the other; mounting means within the hollow housing holding a protector assembly between each line terminal and the ground terminal, and a tubular structure extending inside the second box-like member down from a top wall adjacent each end thereof, the tubular structures being aligned with said line terminal.

2. A protector as claimed in claim 1, said second hollow box-like member fitting within the first hollow box-like member.

3. A protector as claimed in claim 1, including a sealing material in each said tubular structure, the sealing material extending out of the bottom ends of the tubular structures and extending a predetermined distance up the outside of said tubular structures.

4. A protector for communications systems, comprising a hollow housing, the housing including a first hollow box-like member having four side walls of elongate form open at a top face and having a line terminal extending from a bottom face at each end for connection to line conductors, and a ground terminal at a position intermediate the line terminals; a second hollow box-like member of elongate form open at a bottom face, one box-like member fitting within the other; mouting means within the hollow housing holding a protector assembly between each line terminal and the ground terminal, and a line contact member connected to each line terminal, each line contact member of Tee-shape, having a cross bar positioned on the bottom wall of the first box-like member and connected to a line terminal, and a leg extending upwards from said bottom wall.

5. A protector as claimed in claim 4, said mounting means comprising a support and ground member, the support and ground member having a substantially flat bottom member connected to said ground terminal and upward extending arcuate walls, said walls defining a cylindrical mounting position.

6. A protector as claimed in claim 5, each of said walls being in three sections, a center section and two end sections, an end section on either side of said center section.

7. A protector as claimed in claim 5, said bottom member of said support and ground member extending at each end over said cross bar of each line contact member and spaced therefrom, and a back-up protector device positioned between the bottom member and each cross bar.

8. A protector as claimed in claim 7, each said back-up protector device comprising two disc-like electrodes separated by and bonded to an annular disc of insulating material.

9. A protector as claimed in claim 8, said first hollow box-like member having a bottom wall, said bottom wall including a central portion raised upward relative to opposite end portions, said bottom member of said support and ground member positioned on said central portion, said cross bar of each line contact member positioned on said opposite end portions.

10. A protector as claimed in claim 5, said protector assembly comprising two protector devices in axial alignment, each device having two spaced electrodes defining a breakdown gap, a first device having one electrode in contact with one of the line contact members and the other electrode connected to said support and ground member, and a second device having one electrode in contact with the other of the line contact members and the other electrode connected to said support and ground member.

11. A protector as claimed in claim 5, said protector assembly comprising a three-electrode gas tube protector device having a central electrode in contact with said support and ground member and an end electrode positioned on each side of said central electrode and spaced therefrom to define breakdown gaps, one end electrode connected to one of said line contact members and the other end electrode connected to the other line contact member.

12. A protector as claimed in claim 11, said three electrode gas tube protector device comprising;

a central electrode and a line electrode positioned on each side of the central electrode and spaced from the central electrode to define two gaps having a predetermined voltage breakdown, the electrodes forming a sealed assembly with said gaps at a sub-atmospheric pressure;

a conductive outer cup extending axially from each line electrode and a conductive inner cup within each outer cup, the bottom of the outer cup in contact with the line electrode, the inner end of the inner cup spaced from the bottom end of the outer cup, the inner cup having a radially extending member at its outer end, the member spaced axially from the outer cup, and a fusible member positioned between and in contact with the inner end of the inner cup and the bottom end of the outer cup;

a compression spring positioned within said inner cup and a contact member having a head portion and a stem portion, the stem portion extending axially through said spring and said inner end of said inner cup and said bottom of said outer cup, the stem portion having an inner end extending over the outer surface of the bottom of the outer cup, the spring contained in compression between said head portion and said inner end of the inner cup, said head portion extending axially beyond said radially extending member;

the arrangement such that on melting of the fusible element, said inner cup is moved axially by the spring for said flange to contact a ground member.

13. A protector as claimed in claim 12, including a circular central electrode and circular line electrodes and a ceramic ring sealed between each line electrode and the central electrode.

14. A protector as claimed in claim 13, said line electrodes and each ceramic ring having substantially equal outside diameters, and an insulating sleeve positioned over each outer cup and extending axially over the related line electrode and ceramic ring, said central electrode extending radially beyond the outside surface of the insulating sleeves.

15. A protector for communications systems, comprising a hollow housing; the housing including a first hollow box-like member having four side walls of elongate form open at a top face and having a line terminal extending from a bottom face at each end for connection to line conductors, and a ground terminal at a position intermediate the line terminals; a second hollow box-like member of elongate form open at a bottom face, one box-like member fitting within the other; mounting means within the hollow housing holding a protection assembly between each line terminal and the ground terminal; a line contact member connected to each line terminal, each line contact member of Tee-shape, having a cross bar positioned on the bottom wall of the first box-like member and connected to a line terminal, and a leg extending upwards from said bottom wall;

said mounting means comprising a support and ground member, the support and ground member having a substantially flat bottom member connected to said ground terminal and upward extending arcuate walls, said walls defining a cylindrical mounting position; said protector assembly comprising two protector devices in axial alignment, each device having two spaced electrodes defining a breakdown gap, a first device having one electrode in contact with one of the line contact members and the other electrode connected to said support and ground member, and a second device having one electrode in contact with the other of the line contact members and the other electrode connected to said support and ground member; said two spaced electrodes of each device positioned within and bonded to a tubular insulating member, a metal cup extending over said insulating member, the open end of the cup facing said line contact member, a fusible member positioned between said other electrode and the bottom wall of said cup, and a compression spring positioned between the bottom walls of said cups, and said spring urging said cups apart, the arrangement such that on melting of a fusible member of one device, the metal cup will be moved axially and the open end of the cup moved into contact with the line contact member.

* * * * *